United States Patent
Shimizu

(10) Patent No.: US 8,582,158 B2
(45) Date of Patent: Nov. 12, 2013

(54) IMAGE INPUT/OUTPUT APPARATUS AND IMAGE INPUT/OUTPUT METHOD

(75) Inventor: Yasushi Shimizu, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 496 days.

(21) Appl. No.: 12/904,939

(22) Filed: Oct. 14, 2010

(65) Prior Publication Data

US 2011/0090533 A1    Apr. 21, 2011

(30) Foreign Application Priority Data

Oct. 21, 2009    (JP) .................................. 2009-242633

(51) Int. Cl.
  *G06F 3/12*   (2006.01)
  *G06K 15/00*  (2006.01)
  *H04N 1/60*   (2006.01)

(52) U.S. Cl.
  USPC ......... 358/1.15; 358/1.14; 358/1.16; 358/1.9; 707/796

(58) Field of Classification Search
  None
  See application file for complete search history.

(56) References Cited

U.S. PATENT DOCUMENTS

| | | | |
|---|---|---|---|
| 6,667,810 B1 | 12/2003 | Jeyachandran et al. | |
| 7,860,892 B2 * | 12/2010 | Sato | 707/796 |
| 8,248,634 B2 * | 8/2012 | Ishida et al. | 358/1.14 |
| 2006/0119887 A1 * | 6/2006 | Aritomi et al. | 358/1.15 |
| 2008/0046467 A1 * | 2/2008 | Nakajima | 707/104.1 |
| 2008/0082702 A1 * | 4/2008 | Ohtsu | 710/33 |
| 2008/0204807 A1 * | 8/2008 | Nakatsuka | 358/1.16 |
| 2009/0040546 A1 * | 2/2009 | Hirakawa | 358/1.14 |
| 2009/0316170 A1 * | 12/2009 | Tsujii | 358/1.9 |

FOREIGN PATENT DOCUMENTS

| | | |
|---|---|---|
| CN | 1453697 A | 11/2003 |
| JP | 11-119956 A | 4/1999 |
| JP | 2008-134956 A | 6/2008 |
| JP | 2009-223646 A | 10/2009 |

* cited by examiner

*Primary Examiner* — Satwant Singh
(74) *Attorney, Agent, or Firm* — Canon U.S.A., Inc. IP Division

(57) ABSTRACT

An image input/output apparatus includes an execution unit configured to execute a job for inputting or outputting image data, a storage unit configured to store the image data or reference information referring to the image data as history information, an output unit configured to output image data identified based on history information, and a control unit configured to perform control not to store the history information in the storage unit if an attribute of the job indicates that the job is a media print job for printing image data stored in an external storage media and perform control to store the history information if the attribute does not indicate that the job is the media print job.

19 Claims, 10 Drawing Sheets

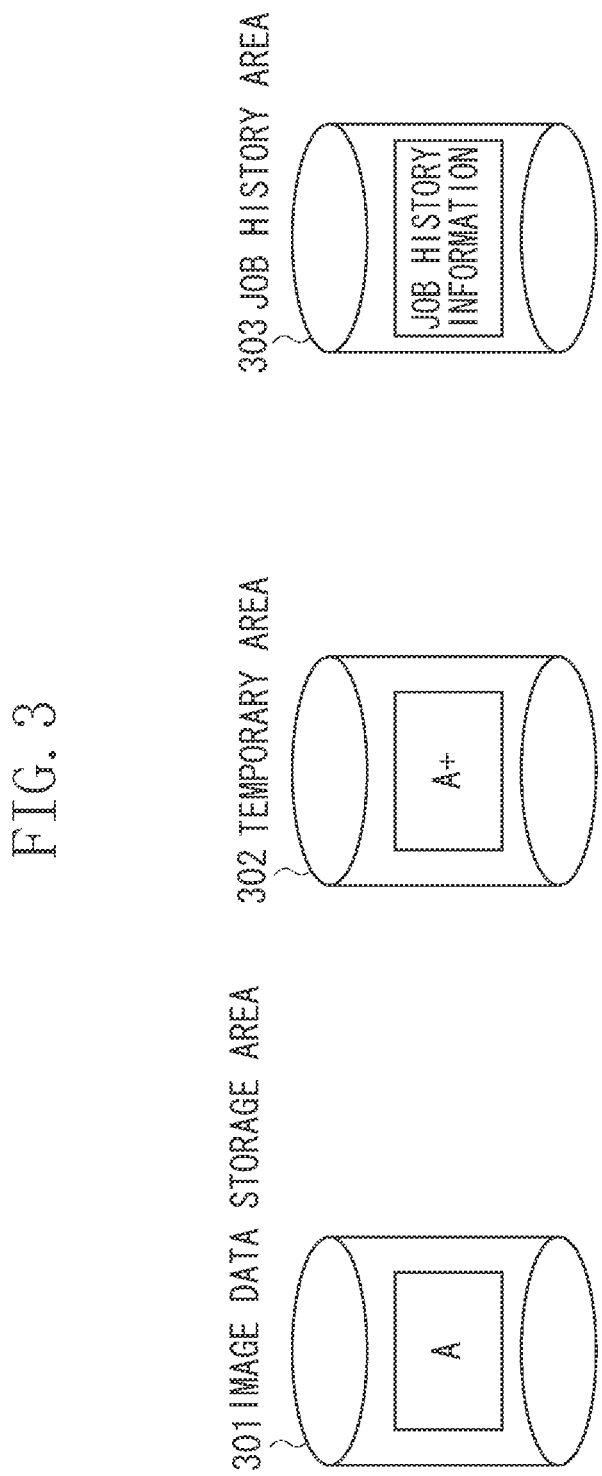

FIG. 4

| Job ID | JOB TYPE | REFERENCE INFORMATION OF ORIGINAL IMAGE | REFERENCE INFORMATION OF COPIED IMAGE | FILE NAME | PRINT SETTING | USER | EXECUTION DATE |
|---|---|---|---|---|---|---|---|
| 1 | PDL Print | UNAVAILABLE | AAA/BBB | 2007_7_28.dat | TWO-SIDED, 2in1, A4 | tanaka | 2008/3/9 |
| 2 | Box Print | XXX/YYY | UNAVAILABLE | 2007_7_29.dat | ONE-SIDED, 1in1, A4 | suzuki | 2008/3/9 |
| 3 | Copy | UNAVAILABLE | AAA/CCC | 2007_7_30.dat | TWO-SIDED, 1in1, A4 | satoh | 2008/3/11 |
| 4 | PDL Print | XXX/YYY | UNAVAILABLE | 2007_7_31.dat | ONE-SIDED, 1in1, A3 | suzuki | 2008/3/11 |

FIG. 5

| ATTRIBUTE | VALUE |
|---|---|
| JOB TYPE | PDL PRINT/BOX PRINT/MEDIA PRINT/COPY |
| CONFIDENTIALITY | SECURE PRINTING/NON |
| SETTING TO BOX | DELETE FROM BOX AFTER PRINT/STORE IN BOX AFTER PRINT |

601
602
603

IMAGE INPUT/OUTPUT APPARATUS AND IMAGE INPUT/OUTPUT METHOD

BACKGROUND OF THE INVENTION

1. Field of the Invention

The present invention relates to an image input/output apparatus capable of outputting image data based on the history information of a job.

2. Description of the Related Art

An image input/output apparatus capable of executing a plurality of print jobs has been known in a conventional image input/output apparatus. The print jobs include, for example, 1) a PDL print job in which page description language (PDL) data received from a PC is printed, 2) a BOX print job in which image data stored in a hard disk of the image input/output apparatus is printed, 3) a copy job in which image data acquired by reading a document image is printed, and 4) a media print job in which image data stored in a removable media such as a USB memory is printed.

Japanese Patent Application Laid-Open No. 11-119956 discusses an image input/output apparatus having a "history print function". The history print function refers to the one in which the data of the executed job is stored in a storage unit after printed and reprinting is performed using the stored image data.

The history print function is used when print setting is changed and image data are printed again after the PDL print job is executed, for example, or the number of prints is changed and the same image data is printed again thereafter.

The technique discussed in Japanese Patent Application Laid-Open No. 11-119956 is used to allow image data to be printed based on history information stored after a job is executed.

However, it can be undesirable to store history information depending on the attribute of a job. For the media print job, for example, data stored in an external storage medium are copied in an image input/output apparatus. If data stored in the external storage medium is confidential, the data may be leaked from the external storage medium to the image input/output apparatus, which is undesirable from the viewpoint of security.

SUMMARY OF THE INVENTION

According to an aspect of the present invention, an apparatus includes an execution unit configured to execute a job for inputting or outputting first image data, a storage unit configured to store the first image data or reference information referring to the first image data as history information, an output unit configured to output image data identified based on history information, and a control unit configured to perform control not to store the history information if an attribute of the executed job indicates that the job is a media print job for printing second image data stored in an external storage media and perform control to store the history information if the attribute does not indicate that the job is the media print job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates a configuration of a HDD 38.

FIG. 4 is a table illustrating job history information.

FIG. 5 is a table illustrating a configuration of attribute information added to a job.

DESCRIPTION OF THE EMBODIMENTS

Various exemplary embodiments, features, and aspects of the invention will be described in detail below with reference to the drawings.

Figure 1:
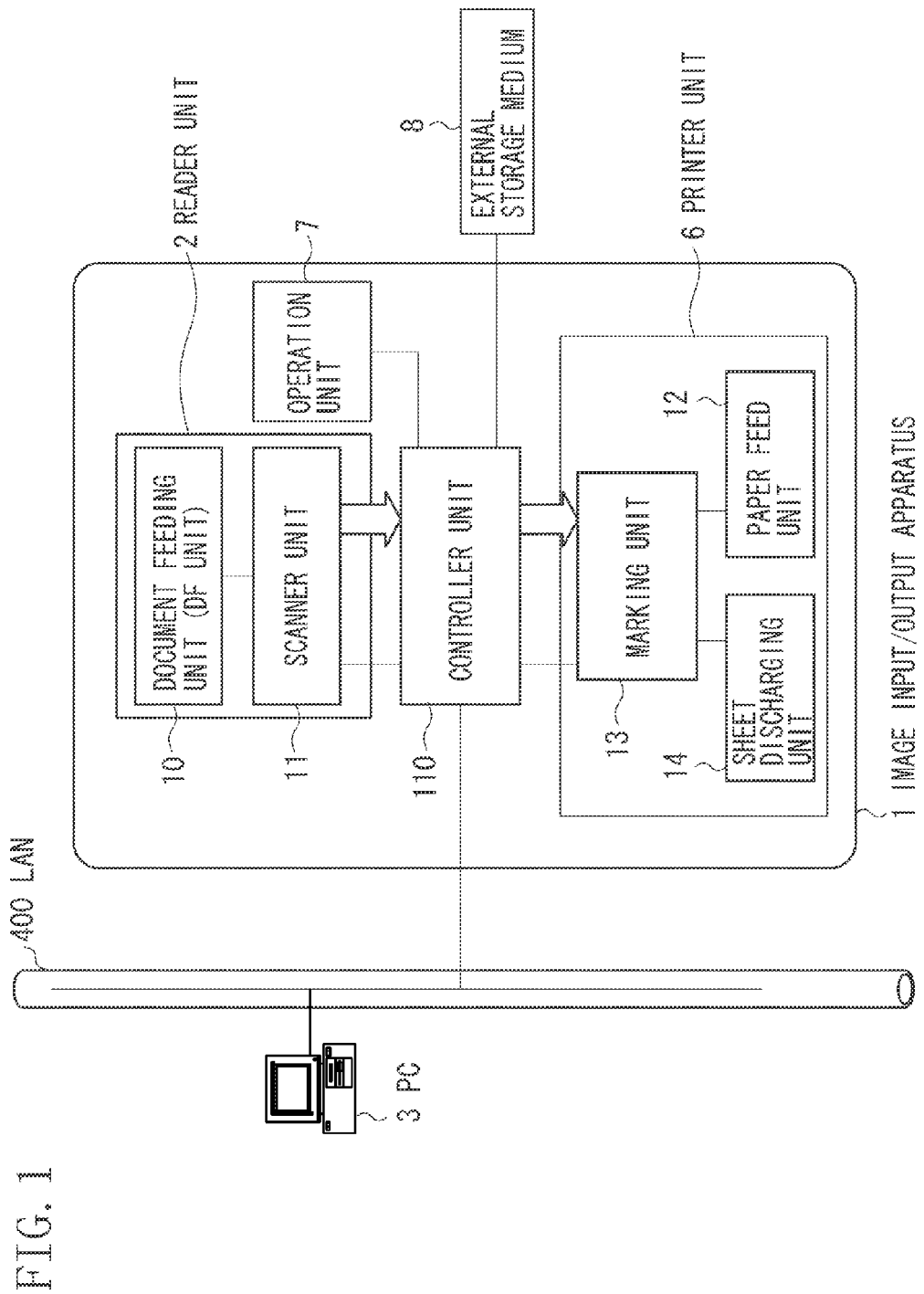
FIG. 1 is a block diagram illustrating a system configuration according to an exemplary embodiment.

FIG. 1 is a block diagram illustrating a configuration of a system including an image input/output apparatus to which the present invention can be applied. An image input/output apparatus 1 and a personal computer (PC) 3 are communicably connected to each other via a local area network (LAN) 400. The PC 3 is an example of an information processing apparatus, and another image input/output apparatus may be connected instead of the PC 3.

The image input/output apparatus 1 includes a reader unit 2, a printer unit 6, an operation unit 7, and a controller unit 110.

The reader unit 2 is an apparatus for reading a document image. The reader unit 2 includes a document feeding unit 10 for conveying a document paper and a scanner unit 11 for optically reading the document image and converting the image to image data as electric signals.

The printer unit 6 is an apparatus for outputting image data. The printer unit 6 includes a paper feed unit 12 equipped with a plurality of sheet cassettes containing recording paper, a marking unit 13 for transferring and fixing image data to the recording paper, and a sheet discharging unit 14 for sorting or stapling a printed recording paper and discharging the paper outside.

The operation unit 7 is an apparatus for outputting a request for executing a job to an operation unit I/F 40 via a liquid crystal panel (not illustrated). The operation unit 7 includes a keyboard for performing an input/output operation of image data, and a liquid crystal panel for displaying image data and various functions.

The reader unit 2, the printer unit 6, and the operation unit 7 may be provided outside the image input/output apparatus 1. An interface circuit for communicating image data between the above units and the controller unit, and an interface circuit for receiving a request for executing a job are provided to realize the present invention.

Figure 2:
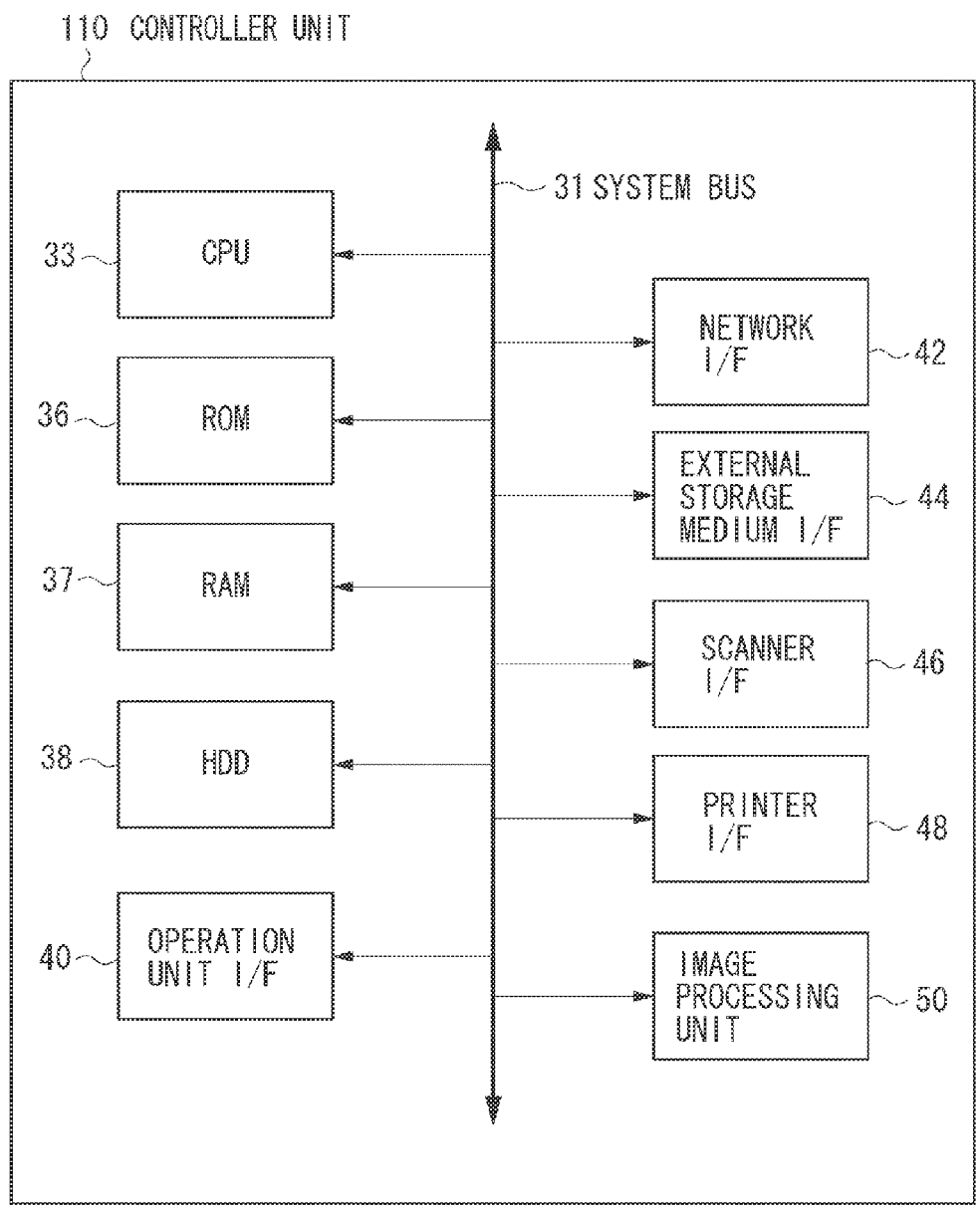
FIG. 2 is a block diagram illustrating a configuration of a controller unit 110.

FIG. 2 is a block diagram illustrating the controller unit 110 in FIG. 1. A CPU 33, a ROM 36, a RAM 37, an HDD 38, an operation unit I/F 40, a network I/F 42, an external storage medium I/F 44, a scanner I/F 46, a printer I/F 48, and an image processing unit 50 are connected to one another via a system bus 31.

The CPU 33 controls the entire system. The RAM 37 is a system work memory for operating the CPU 33. The ROM 36 stores a program for realizing the present invention. The HDD 38 is a hard disk drive for storing system software and image data. The detail data configuration of the HDD 38 is described later. A solid state drive (SSD) may be used instead of the HDD 38.

The operation unit I/F 40 is an interface circuit for outputting information input from the operation unit 7 to the CPU 33, and outputting image data displayed on the operation unit 7 to the operation unit 7.

The scanner I/F 46 is an interface circuit for outputting image data received from the reader unit 2 to the image processing unit 50.

The printer I/F 48 is an interface circuit for outputting image data received from the network I/F 42 or the image processing unit 50 to the printer unit 6.

The image processing unit 50 performs various image processing on the input image data. For example, if a user designates print setting via the operation unit 7, the image processing unit 50 rasterizes image data inputted with the designated print setting reflected to raster image data.

The external storage medium I/F 44 is an interface circuit for connecting the image input/output apparatus 1 and an external storage medium 8, and detects connection with the external storage medium 8. The external storage medium I/F 44 reads image data from the memory region of the external storage medium 8. The external storage medium 8 is a storage medium such as a USB memory, for example, and detachably connected to the image input/output apparatus 1.

FIG. 3 illustrates the storage area of the HDD 38 in FIG. 2.

The HDD 38 has three areas: an image data storage area 301, a temporary area 302, and a job history area 303. In the present exemplary embodiment, although the HDD 38 is used with the HDD 38 divided into three areas, the HDD 38 does not always need to be physically divided into three areas if it is identifiable that data stored in each address of the hard disk correspond to which area. Those divided areas may be positioned in other hard disk.

The image data storage area 301 is the one for storing the image data of a job. The image data stored in the image data storage area 301 may be document image data or other image data such as photos.

The temporary area 302 is the one for temporarily storing the image data on which image processing is performed by the image processing unit 50 with respect to the image data stored in the image data storage area 301.

The job history area 303 is the one for storing the history information of a job (hereinafter referred to as job history information). The job history information is used for not only confirming the execution history of a job, but performing print again. The job history information includes image data of a job itself or reference information referring to the image data of a job.

A job executed by the image input/output apparatus 1 is described below.

In the present exemplary embodiment, the image input/output apparatus 1 executes a PDL print job, a BOX print job, a media print job, and a copy job.

The PDL print job is the one for printing the PDL data received from the PC3. The network I/F 42 receives the PDL data and a request for executing a job from the PC 3. The received PDL data is rasterized into raster image data by the image processing unit 50 and stored in the temporary area 302.

The printer I/F 48 outputs raster image data to the printer unit 6. The printer unit 6 prints raster image data received from the printer I/F 48 on recording paper.

The BOX print job is the one for printing image data stored in the image data storage area 301. Image data is stored in the image data storage area 301 in the JPEG format or the PDL data format, for example. The CPU 33 receives a request for executing a job via the operation unit I/F 40, and then reads image data in the image data storage area 301. The read image data is processed by the image processing unit 50 to image data that can be processed by the printer unit 6, and stored in the temporary area 302.

The image processing unit 50 decompresses the compressed data if the image data in the image data storage area 301 is stored in the JPEG format. If the image data stored in the image data storage area 301 is PDL data, the image processing unit 50 rasterizes the PDL data into raster images. The printer I/F 48 outputs image data in the temporary area 302 to the printer unit 6. The printer unit 6 prints the raster image data received from the printer I/F 48 on the recording paper.

The BOX print job is not the one for printing the image data in the image data storage area 301 of the HDD 38, but may be the one for printing the image data stored in the external hard disk of the image input/output apparatus 1. More specifically, if the image input/output apparatus 1 can access the hard disk, the BOX print job does not always need to be the job for printing the image data stored in the HDD 38 of the image input/output apparatus 1.

A job for printing the image data stored in the external hard disk connected to the image input/output apparatus 1, for example, is also included in the BOX print job. Furthermore, a job for printing the image data stored in the hard disk of other image input/output apparatus existing on a network is also included in the BOX print job. Still furthermore, a job for printing the image data stored in a file server such as a network attached storage (NAS) is also included in the BOX print job.

The media print job is the one for printing the image data stored in the external storage medium 8 detachably connected to the image input/output apparatus 1. The external storage medium I/F 44 reads the image data stored in the external storage medium 8 in response to the connection of the external storage medium 8 to the image input/output apparatus 1.

The CPU 33 stores the read image data in the temporary area 302. The CPU 33 outputs the image data in the temporary area 302 to the printer unit 6. The printer unit 6 prints raster image data received from the printer I/F 48 on recording paper. After printing on the recording paper is completed, the image data in the temporary area 302 is deleted according to the instruction of the CPU 33.

The copy job is the one for printing the image data produced by the reader unit 2 reading a document image. The CPU 33 receives a request for executing the copy job and then the reader unit 2 reads a document image based on the instruction of the CPU 33. The image data produced by reading the document image are stored in the temporary area 302 of the HDD 38 via the scanner I/F 46.

The printer I/F 48 outputs the image data stored in the temporary area 302 to the printer unit 6. The printer unit 6 prints the image data received from the printer I/F 48 on recording paper.

For the sake of simplicity of the following description, the image data stored in the image data storage area 301 and the temporary area 302 are referred to as an image data A and an image data A+ respectively.

The job history information in FIG. 3 is described with reference to FIG. 4. The job history information includes items of job ID 401, job type 402, reference information of original image data 403, reference information of copied image data 404, file name 405, print setting 406, user 407, and execution date 408.

The job ID 401 is information for uniquely identifying a job. The CPU 33 provides the job ID for each job. A timing at which the job ID 401 is provided for the job is not particularly limited. The job ID 401 may be provided in response to the execution of the job, or the reception of a request for executing a job, for example.

The job type 402 is the one classified according to the function of a job. Information about the copy job, PDL print job, BOX print job, and media print job is stored therein.

The reference information of original image data 403 is the one for referring to the image data of the executed job. A path name indicating a location where the image data is stored is stored therein. In the case of the BOX print job, for example, the path name of the image data stored in the image data storage area 301 is stored.

The reference information may be a uniform resource locator (URL), a domain name, or the name of a server which stores image data, for example, instead of the path name. If it is possible to refer to the executed image data using production date of a file, executed user information, and others, the reference information may be the production data of a file or a user name, or a combination of those.

The reference information of copied image data 404 is the one concerning the image data copied into the job history area 303. The path name of the copied image data is stored.

The file name 405 is the one for the image data stored in the job history area 303.

The print setting 406 is such information as paper size, one-sided/two-sided, and Nup print. The user 407 is information about a user who has executed a job. The execution date 408 indicates a date on which a job is executed.

The configuration of attribute information of a job is described below with reference to FIG. 5. In the present exemplary embodiment, attribute information 601 to 603 in the form illustrated in FIG. 5 are added, to a job and received with the image data of the job. The attribute information is set by the CPU 33 when the user instructs the CPU 33 to execute a job via the operation unit 7 or the PC 3.

The attribute information 601 indicates the job type. Any one of attribute values of "PDL print", "BOX print", "media print", and "copy" is set. If the value of the attribute information 601 is the PDL print, a PDL print job is executed. If the value of the attribute information 601 is the BOX print, a BOX print job is executed. If the value of the attribute information 601 is the media print, a media print job is executed. If the value of the attribute information 601 is copy, a copy job is executed.

The attribute information 602 indicates the confidentiality of a job. Any of attribute values of "secure print" or "non" is set. In the secure print, printing is not performed immediately after the reception of a request for executing a job, but performed on the condition that authentication information or a password for identifying a user is inputted from the operation unit.

Such printing that a process for protecting the confidentiality of data used for printing is performed is also included in the secure print. A print job with a process for encrypting data used in printing such as the PDL data, for example, may be included in the secure print.

The secure print is previously set to allow preventing the image data of a job from being printed by an outsider excluding a particular user. If the value of the attribute information 602 is the secure print, a secure print job is executed for the job.

The attribute information 603 indicates setting to BOX. The BOX refers to the image data storage area 301. Any one of attribute values of "delete from BOX after print," "store in BOX after print", and "non" is set.

If the attribute value of "delete from BOX after print" is set and the image data of a job is stored in the image data storage area 301 after the job is executed, the image data is deleted. If the attribute value of "store in BOX after print" is set, the image data of the executed job is stored in the image data storage area 301. If "non" is set, a job is executed without storing in the image data storage area 301 or deleting image data stored therein.

Figure 6:
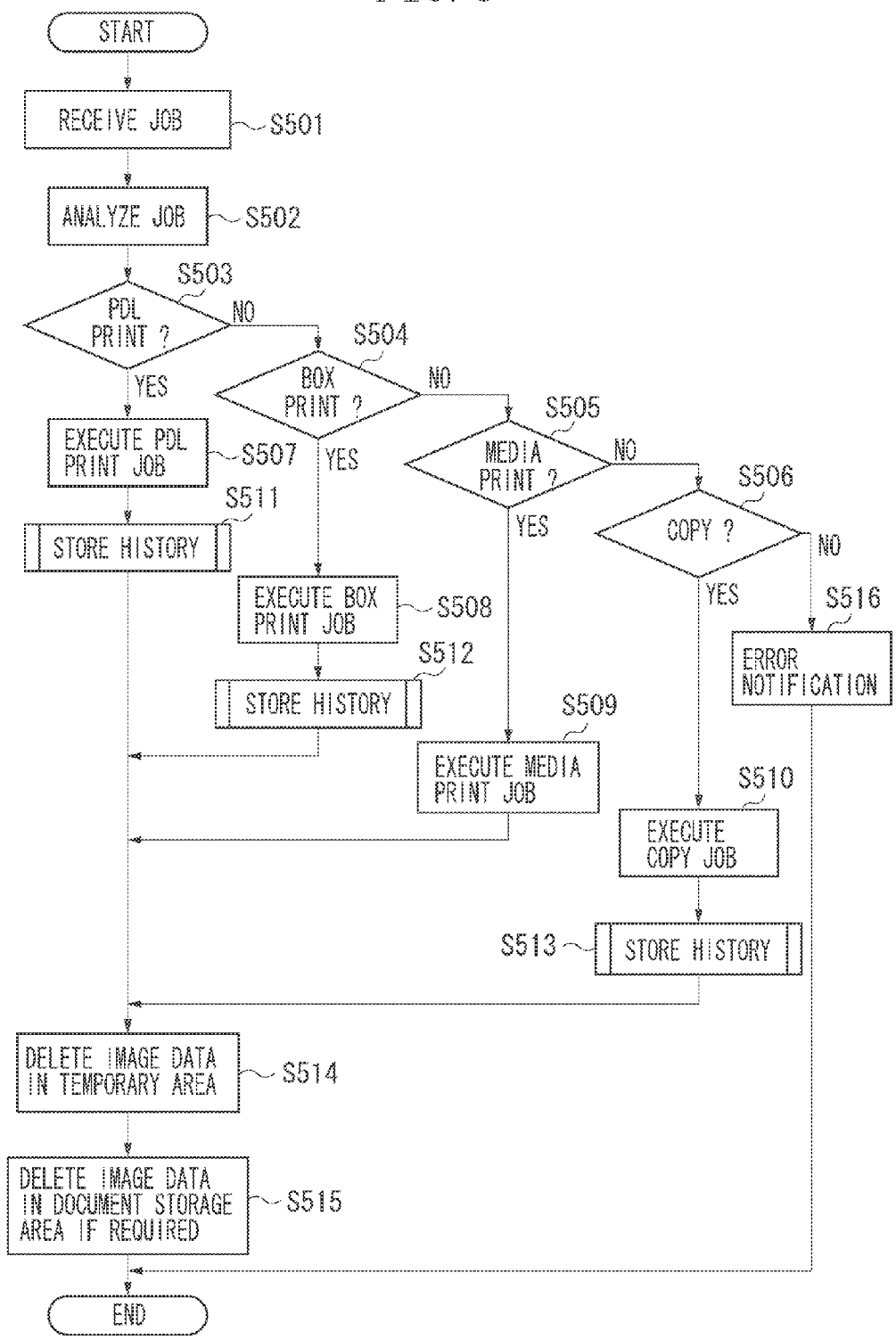
FIG. 6 is a flow chart illustrating an entire process of an exemplary embodiment.

FIG. 6 is a flow chart illustrating the execution of a job according to the present exemplary embodiment. Each operation illustrated in the flow chart in FIG. 6 is realized by the CPU 33 loading the program stored in the ROM 36 into the RAM 37 and executing the program.

In step S501, the user selects a job via the touch panel of the operation unit 7, and gives instructions to execute the job. When the operation unit I/F 40 detects that the user has selected the job, the CPU 33 receives a request for executing the job.

A job to be received is any of the copy job, PDL print job, BOX print job, and media print job. For the PDL print job, the request for executing the job is received not from the operation unit 7 but from the PC 3 via the LAN 400.

In step S502, the CPU 33 analyzes the attribute information of the job. The CPU 33 analyzes the value of the attribute information 601 in FIG. 5 and executes the job according to the value. In step S503, as a result of the analysis in step S502, if the attribute indicating the job type is the PDL print (YES in step S503), the processing proceeds to step S507. If the attribute is not the PDL print (NO in step S503), the processing proceeds to step S504.

In step S504, as a result of the analysis in step S502, if the attribute is the BOX print (YES in step S504), the processing proceeds to step S508. If the attribute is not the BOX print (NO in step S504), the processing proceeds to step S505.

In step S505, as a result of the analysis in step S502, if the attribute is the media print (YES in step S505), the processing proceeds to step S509. If the attribute is not the media print (NO in step S505), the processing proceeds to step S506. In step S506, as a result of the analysis in step S502, if the attribute is the copy (YES in step S506), the processing proceeds to step S510. If the attribute is not the copy (NO in step S506), an error is notified in step S516, and the processing is ended.

In step S507, the CPU 33 executes the PDL print job. The CPU 33 receives the PDL data sent from the PC 3 via the LAN 400 and the network I/F 48, rasterizes the received PDL data into a raster image, and stores the raster image in the temporary area 302.

The CPU 33 outputs the image data to the printer unit 6. The CPU 33 determines whether to perform the secure print based on the attribute value indicating the confidentiality of the job. The CPU 33 determines whether to store the image data in the image data storage area 301 based on the attribute value indicating setting to BOX.

In step S508, the CPU 33 executes the BOX print job. The CPU 33 reads the image data A, converts the image data A to data reflecting print setting, and outputs the data to the print unit 6. The printer 6 prints the output image data on recording paper.

In step S509, the CPU 33 executes the media print job. The CPU 33 recognizes that the external storage medium 8 is connected to the external storage medium I/F 44. After the external storage medium 8 is recognized, the external storage medium I/F 44 reads the image data stored in the external storage medium 8.

The user sets a print condition concerning the read image data using the touch panel of the operation unit 7. The user depresses an execution button via the operation unit 7 to cause the CPU 33 to receive a request for executing a job, and output the image data read according to the set print condition to the printer unit 6. The printer 6 prints the output image data on recording paper.

In step S510, the CPU 33 executes the copy job. The CPU 33 instructs the reader unit 2 to read a document image. The image processing unit 50 compresses the image and performs processing for rotating the image with respect to the printer unit 6 and for inserting page number according to user setting, for example.

The processed image data is transmitted to the printer unit 6 via the printer I/F 48, and output to the printer unit 6. The printer 6 prints the output image data on recording paper.

In steps 511 to 513, the CPU 33 stores history information according to the job type. In step S511, job history information in the PDL print job is stored. In step S512, job history information in the BOX print job is stored. In step S513, job history information in the copy job is stored.

The job history information illustrated in FIG. 4 is stored in the job history area 303 according to the type of each job. The job history information used for executing a history print function is stored. A detailed description is made with reference to the flow charts in FIGS. 7 to 10.

In step S514, the CPU 33 deletes the image data A+. In step S515, the CPU 33 deletes the image data A if required. Incidentally, the CPU 33 determines whether to delete the image data A according to the value of the setting to BOX 603 of the attribute information added to a job.

The user or a system administrator may give an instruction as to whether to delete the image data A via the operation unit 7. An instruction to delete the image data A may be given by designating time or in response to the output of the specific number of prints.

In the present exemplary embodiment, for the PDL print job, the BOX print job, and the copy job, the job history information is stored. For the media print job, however, the job history information is not stored. This is because, for the media print job, if the image data stored in the external storage medium 8 is stored as the job history information, the image data is left in the image input/output apparatus 1, which is undesirable from the viewpoint of security.

Selection as to whether the job history information is stored according to the job type enables effective use of the storage area.

Figure 7:
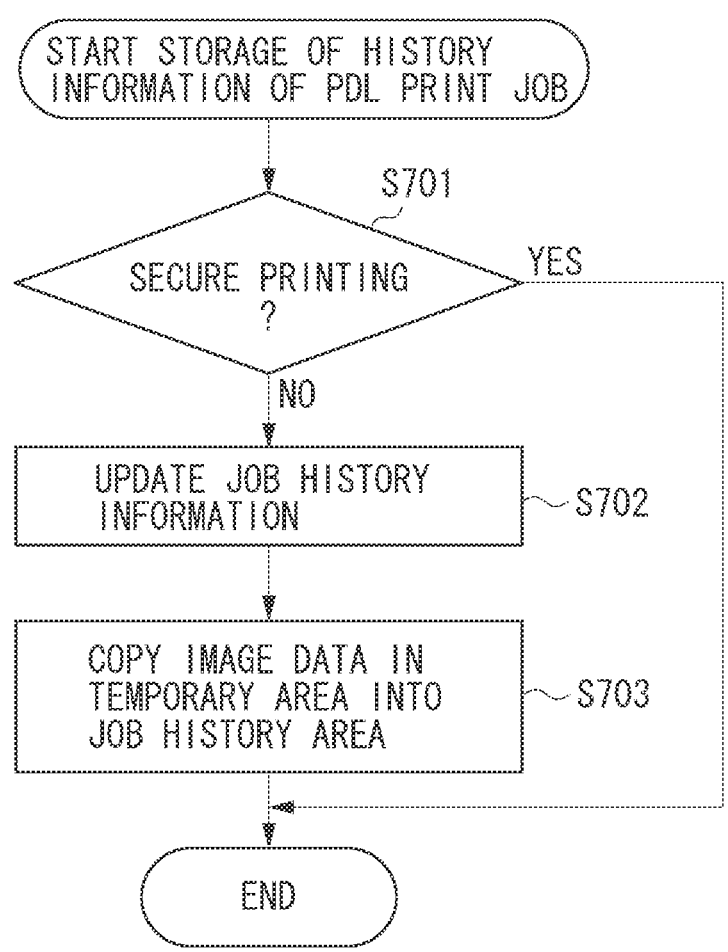
FIG. 7 is a flow chart illustrating a process for storing history information in a PDL print job.

FIG. 7 is a flowchart illustrating in detail a process for storing the job history information in the PDL print job in step S511.

In step S701, the CPU 33 determines whether the value indicating confidentiality of the attribute information of the received job is secure print. If the value is the secure print (YES in step S701), the process of the flow chart is ended. If the value is not the secure print (NO in step S701), the processing proceeds to step S702.

In step S702, the CPU 33 stores the job history information. The items of the job ID 401, job type 402, file name 405, print setting 406, user 407, and execution date 408 illustrated in FIG. 4 are stored in the job history area 303 as the job history information.

In step S703, the CPU 33 copies the image data A+ from the temporary area 302 into the job history area 303. The CPU 33 writes the path name of the copied image data into the item of the reference information of the copied image data 404, and ends the flow chart.

Thus, if the job type is the PDL print and a secure print job is executed, the job history information is not stored. This enables confidential data transmitted via the network to be prevented from being history-printed by outsiders, and thus security can be maintained.

Figure 8:
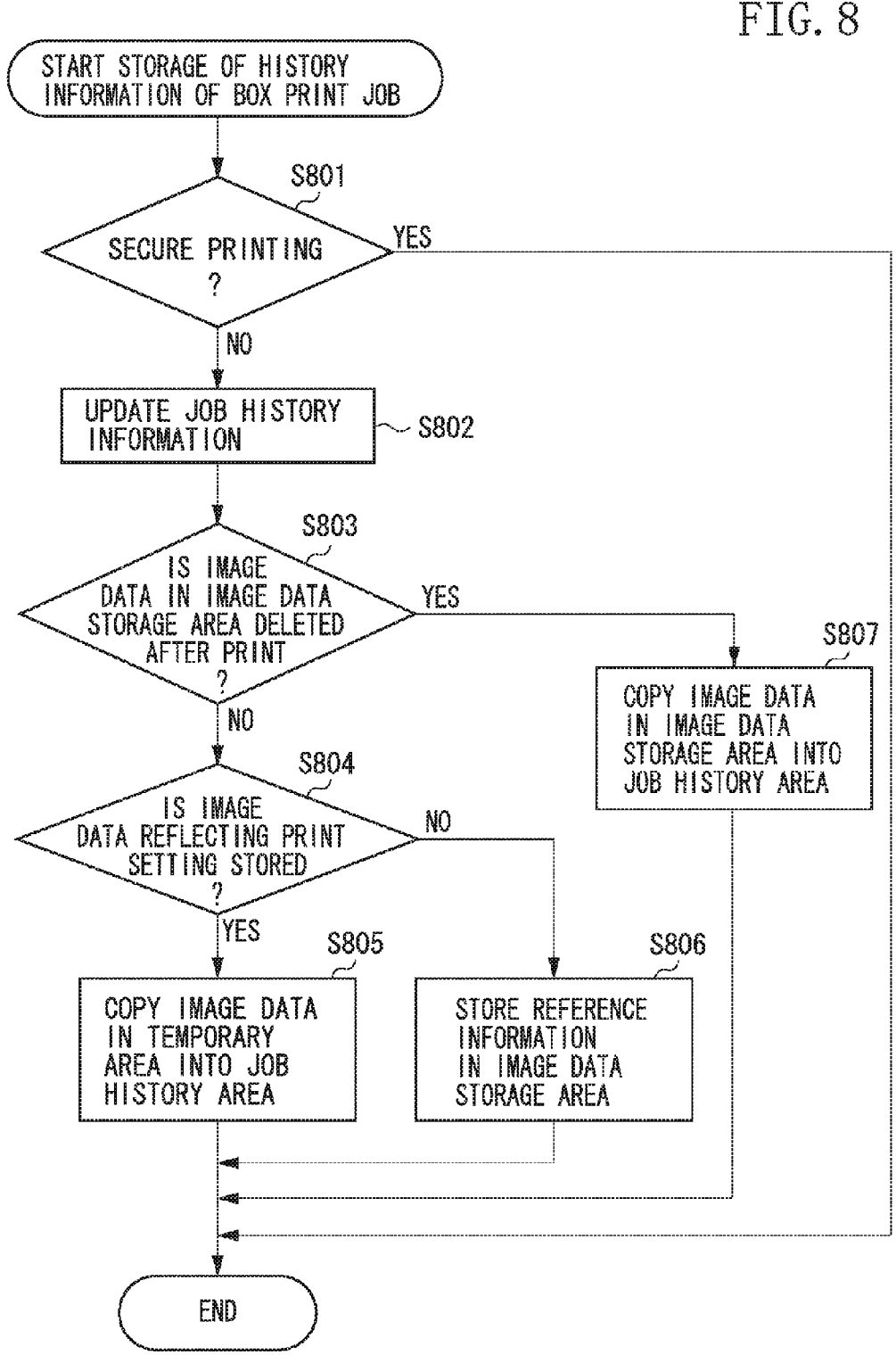
FIG. 8 is a flow chart illustrating a process for storing history information in a COPY print job.

FIG. 8 is a flow chart illustrating a process for storing the job history information in the BOX print job in step S512.

In step S801, the CPU 33 determines whether the attribute information indicating the secured print is added to the received job. The secure print refers to print based on setting concerning the confidentiality of a job.

The secure print in the BOX print job refers to print performed on the condition that authentication information or a password for identifying a user is input from the operation unit 7 when the image data stored in the image data storage area 301 is printed.

If the attribute information indicating the secure print is added (YES in step S801), the process of the flowchart is ended. If the attribute information indicating the secure print is not added (NO in step S801), the processing proceeds to step S802.

In step S802, the CPU 33 stores the job history information in the job history area 303. The items of the job ID 401, job type 402, file name 405, print setting 406, user 407, and execution date 408 illustrated in FIG. 4 are stored in the job history area 303 as the job history information.

In step S803, the CPU 33 analyzes the attribute information of the job to determine whether to delete the image data A from the image data storage area 301 after the image data A is printed. As a result of the analysis, if setting is made to delete the image data A (YES in step S803), the processing proceeds to step S807. If setting is not made to delete the image data A (NO in step S803), the processing proceeds to step S804.

In step S804, the CPU 33 analyzes the attribute information of the job to determine whether to store the image data reflecting the print setting 406. The print setting 406 is the item of the print setting illustrated in FIG. 4. As a result of the determination, if the CPU 33 determines to store the image data reflecting the print setting 406 (YES in step S804), the proceeding proceeds to step S805. If the CPU 33 determines not to store the image data reflecting the print setting 406 (NO in step S804), the proceeding proceeds to step S806.

In step S805, the CPU 33 copies the image data A+ from the temporary area 302 into the job history area 303. The CPU 33 writes the path name indicating the location where the image data A is stored into the item of the reference information of the copied image data 404 in the job history information.

When history print is performed with a print condition changed, the image data A identified with a path name is printed. When history print is performed with a print condition unchanged, the image data A+ in the job history area 303 is printed.

In step S806, the CPU 33 writes the path name indicating the location where the image data A is stored into the item of the reference information of original image data 403 in the job history information.

In step S807, the CPU 33 copies the image data A from the image data storage area 301 into the job history area 303. The CPU 33 writes the path name of the copied image data into the item of "the reference information of copied image data 404" in the job history information in FIG. 4.

Thus, for the BOX print job, since the image data A is stored in the image data storage area 301, information referring to the image data A is stored as the job history information. This eliminates the need for storing the same data redundantly in the image data storage area 301 and the job history area 303 to allow the effective use of the hard disk.

Attribute information indicting the deletion of the image data A from the BOX after the execution of a job (after printing) can be added to a request for executing the job. In this case, the image data A stored in the image data storage area 301 is copied and stored in the job history area 303. This allows a sure history print.

There are two cases where history print is performed with the print setting of the executed job changed and unchanged. In a case where the history print is performed with the print setting of the executed job unchanged, the image data subjected to image processing is used to allow quicker printing.

In a case where the history print is performed with the print setting unchanged, unless there exists the image data yet to be subjected to image processing, the history print cannot be performed. Then, in step S805, the reference information (path name) of the image data A stored in the image data storage area 301 and the image data A+ stored in the temporary area 302 are stored in the job history area 303.

In a case where the history print is performed with the print setting changed, the history print is performed based on the reference information of the image data A. In a case where reprint is performed with the print setting unchanged, the history print is performed based on the image data A+.

Figure 9:
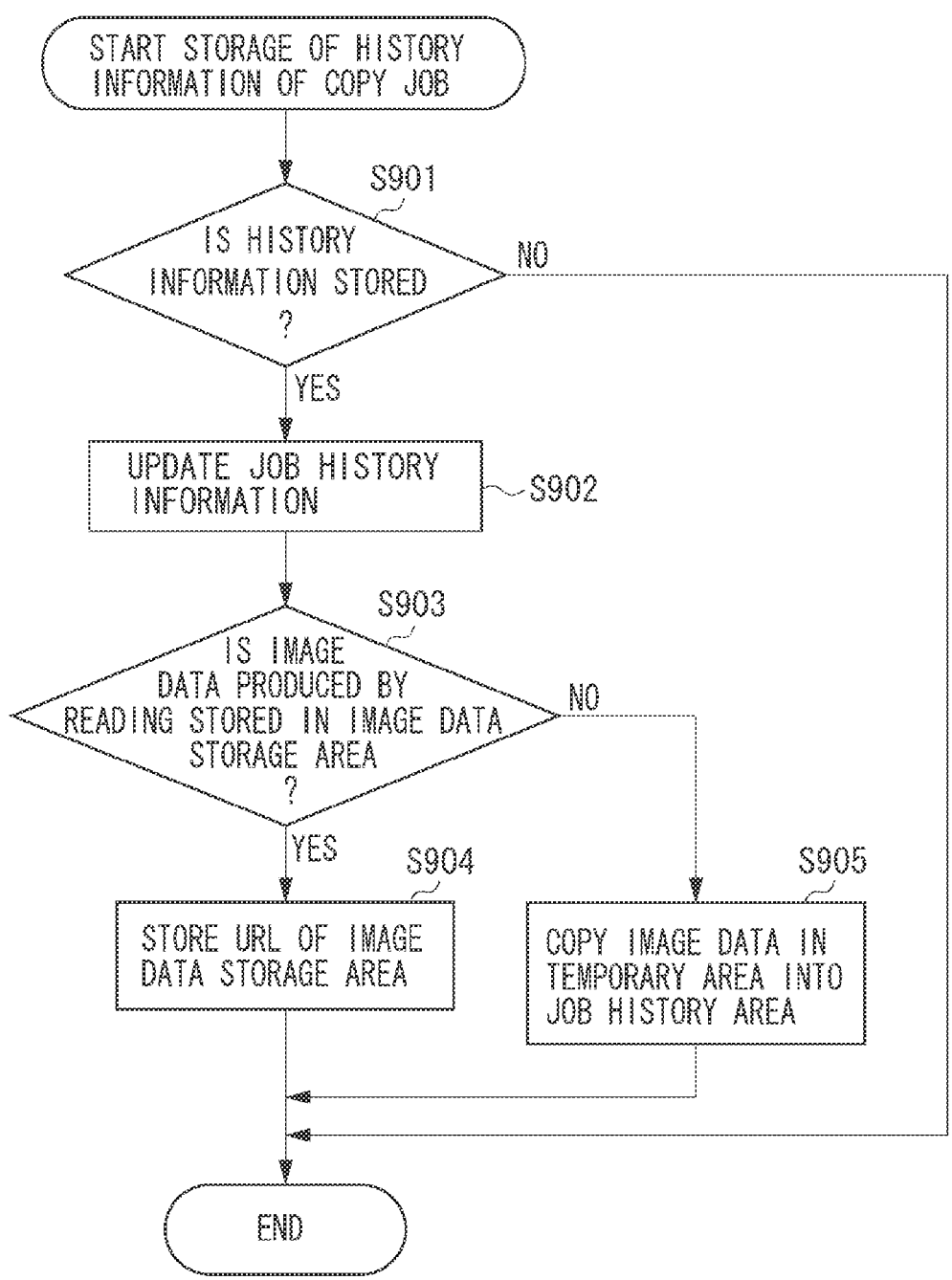
FIG. 9 is a flow chart illustrating a process for storing history information in a BOX print job.

FIG. 9 is a flow chart illustrating in detail a process for storing history information in the copy job in step S513.

In step S901, the CPU 33 determines whether to store the job history information based on the attribute information of a job. The determination is made based on the attribute value indicating the confidentiality of the attribute information. If the CPU 33 determines that the job history information is not stored (NO in step S901), the flow chart is ended. If the CPU 33 determines that the job history information is stored (YES in step S901), the processing proceeds to step S902.

In step S902, the CPU 33 stores the job ID 401, job type 402, file name 405, print setting 406, user 407, and execution date 408 in the job history area 303 as the job history information.

In step S903, the CPU 33 analyzes the attribute information of the executed job to determine whether the attribute information is set to store the read image data in the image data storage area 301. The determination is made based on the attribute value indicating setting to BOX of the attribute information. As a result of the determination, if the CPU 33 determines that the attribute information is set to store the image data in the image data storage area 301 after the image data is copied (YES in step S903), the proceeding proceeds to step S904. If not (NO in step S903), the proceeding proceeds to step S905.

In S904, the CPU 33 writes the path name of the image data A into the reference information of original image data 403 in the job history information.

In step S905, the CPU 33 copies the image data A+ into the job history area 303. The CPU 33 writes the path name of the copied image data A into the reference information of the copied image data 404 in the job history information.

Thus, for the copy job, the copied image data is stored as the job history information therein. As a result, the history print can be performed based on the job history information. However, in some cases the attribute information may be set to store the image data in the BOX after the image data is copied depending on jobs.

In this case, the reference information is stored as the job history information to prevent the same image data from being redundantly stored by storing the image data in the job history area 303 as the job history information. This allows favorably storing the job history information to be used for the history print.

According to the present exemplary embodiment, different history information is stored based on the job type. As a result, the storage method suited for each job can be provided. Furthermore, according to the present exemplary embodiment, different history information is stored based on the job type and the confidentiality of a job. As a result, confidential data received from an external apparatus, for example, can be prevented from being history-printed by outsiders.

Still furthermore, according to the present exemplary embodiment, different history information is stored based on the job type and the setting of storage in or deletion from the BOX. This allows reducing the redundant storage of the same data in the storage area.

In the present exemplary embodiment described in FIG. 6, for the media print job, the job history information is not stored. However, the job image data themselves are not stored in the image input/output apparatus 1, but only the reference information referring to the job image data may be stored. As a result, unless the external storage medium 8 is connected to the external storage medium I/F 44, the history print cannot be performed. Only if the external storage medium 8 is connected to the external storage medium I/F 44, the history print can be performed.

Figure 10:
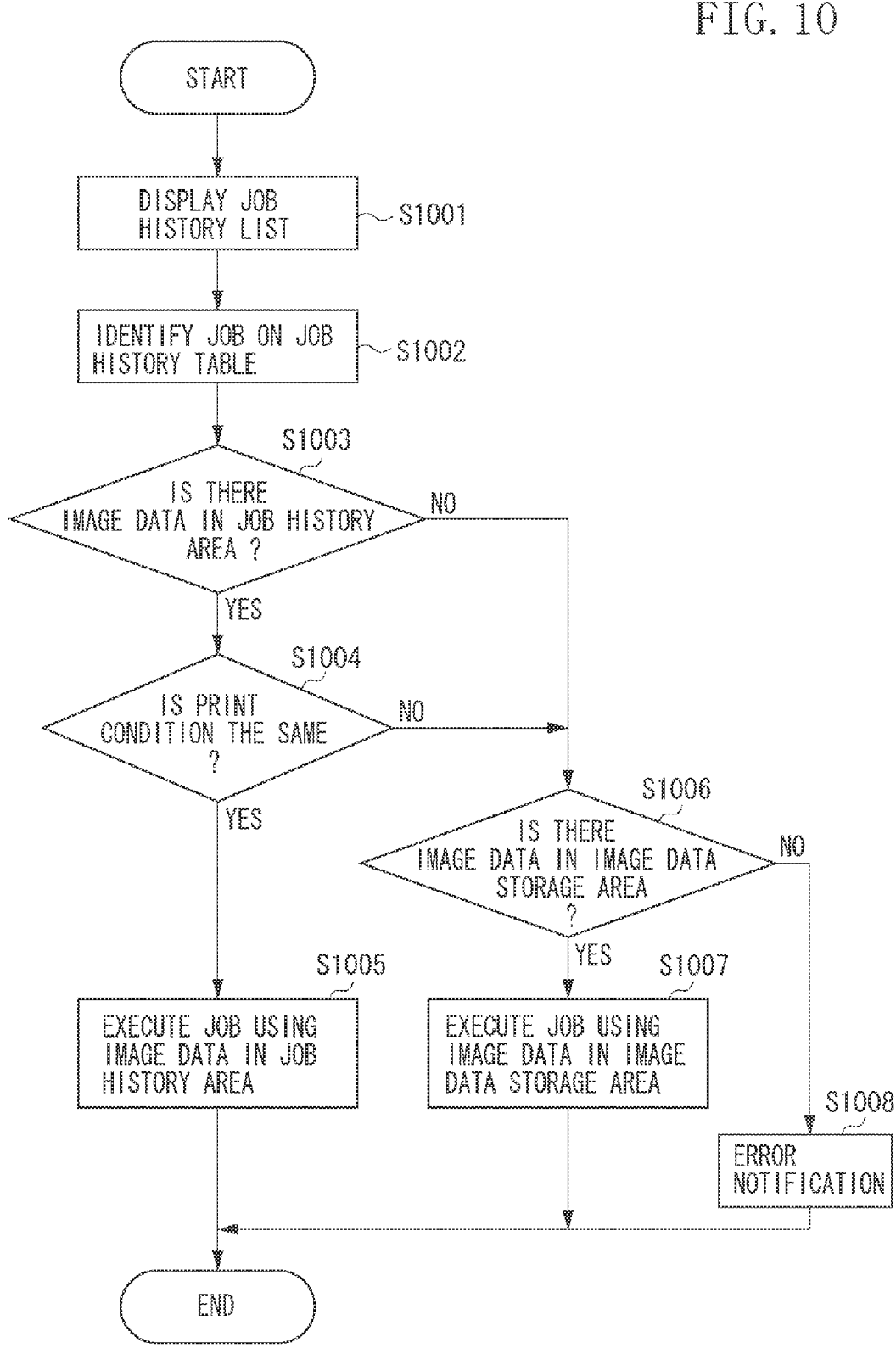
FIG. 10 is a flow chart illustrating a process for history print.

FIG. 10 is a flow chart illustrating a process for printing based on the job history information. Each operation illustrated in the flow chart in FIG. 10 is realized by the CPU 33 loading the program stored in the ROM 36 into the RAM 37 and executing the program.

The user selects a button displaying a job history list via the operation unit 7 to start the flow chart.

In step S1001, the CPU 33 receives a request for displaying the job history information, and displays the job history information in FIG. 4 on the touch panel of the operation unit 7.

In step S1002, the user selects a job to be history-printed from the job history information displayed on the touch panel of the operation unit 7. The CPU 33 identifies the job to be history-printed in response to the user selecting the job to be history-printed.

In step S1003, the CPU 33 searches the item of the reference information of copied image data 404 in the job history information to confirm if image data exists in the job history area 303.

In step S1004, the CPU 33 confirms if the previous print condition of a job is changed.

In step S1005, the CPU 33 executes print using the image data A or the image data A+ stored in the job history area 303.

In step S1006, the CPU 33 refers to the reference information of the job history information to search for the original image data. The CPU 33 confirms if the original image data exists, and can be accessed. As a result of the confirmation, if the original image data exists and can be accessed (YES in step S1006), the processing proceeds to step S1007. If the original image data does not exist or the original image data cannot be accessed (NO in step S1006), the processing proceeds to step S1008.

In step S1007, the CPU 33 reads the image data in the image data storage area 301 to execute print.

In step S1008, the CPU 33 displays a message that printing cannot be performed on the touch panel of the operation unit 7.

The history information of the job executed in steps S1005 or S1007, i.e., that of the print job itself based on the job history information may be stored in the job history area 303. The user may be allowed to select whether the history information of the job itself, in which the history print is executed, is left.

As described above, according to the present exemplary embodiment, the image input/output apparatus determines whether the history information is stored according to the job type. This allows favorably storing the information for the history print.

The job for outputting the image data is described above with the print job using the printer unit 6 taken as an example. However, the job transmitted via the network can be applied to the present invention instead of the print job using the printer unit 6. An e-mail transmission job, for example, can be applied to the present invention. In this case, after the image data is transmitted, the transmitted image data is stored in the job history area 303. Data is transmitted again via the network based on the image data stored in the job history area 303.

The history output can be performed in a different output form in which, for example, print is performed using the print unit 6 based on the image data of the job transmitted via the network. In this case, a job is executed in an output method different from the one for the previously executed job based on the job history information, thereby producing an advantage that a plurality of jobs can be flexibly executed.

Furthermore, not a job outputting image data, but a job inputting image data can be applied to the present invention. The job inputting image data refers to the one for storing the image data read by the reader unit 2, for example, into the HDD 38. In a case where the job is applied to the present invention, the image data input into the controller unit 110 are stored in the HDD 38 and the job history area 303. The image data is output to the printer unit 6 based on the image data stored in the job history area 303.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

This application claims priority from Japanese Patent Application No. 2009-242633 filed Oct. 21, 2009, which is hereby incorporated by reference herein in its entirety.

What is claimed is:

1. An apparatus comprising:
   an execution unit configured to execute a job for inputting or outputting first image data;
   a storage unit configured to store the first image data or reference information referring to the first image data as history information;
   an output unit configured to output the first image data identified based on history information; and
   a control unit configured to perform control not to store the history information if an attribute of the executed job indicates that the job is a media print job for printing second image data stored in an external storage media apparatus, and perform control to store the history information if the attribute does not indicate that the job is the media print job.

2. The apparatus according to claim 1, wherein the control unit performs a selective control as to whether to store the first image data as the history information or store the reference information as the history information.

3. The apparatus according to claim 1, wherein, if the attribute of a job indicates that the job is one for printing third image data received from a processing apparatus, the control unit performs control to store the third image data as the history information.

4. The apparatus according to claim 1, wherein, if the attribute of a job indicates that the job is one for printing forth image data stored in a storage apparatus of an image forming apparatus, the control unit performs control to store reference information referring to the forth image data as history information.

5. The apparatus according to claim 1, wherein, if the attribute of the job indicates that the job is one for printing fifth image data produced by reading a document, the control unit performs control to store the fifth image data as history information.

6. The apparatus according to claim 4, wherein, if the attribute indicates that the job is one for printing the forth image data and that the forth image data are deleted from the storage apparatus, the control unit performs control to store the forth image data in the storage unit as history information.

7. The apparatus according to claim 4, wherein, if the attribute indicates that the job is one for printing the fifth image data produced by reading a document and that the forth image data, the control unit performs control to store the reference information of the forth image data in the storage unit as history information.

8. The apparatus according to claim 1, wherein, if the attribute indicates confidentiality of the job, the control unit performs control not to store the history information in the storage unit.

9. The apparatus according to claim 8, wherein, if the attribute indicating the confidentiality of the job is one indicating a job for performing secure print, the control unit performs control not to store the history information in the storage unit.

10. The apparatus according to claim 1, wherein, if the attribute of the job indicates that the job is one for printing forth image data stored in a storage apparatus, the control unit performs control to store the reference information referring to the forth image data and the first image data as history information.

11. The apparatus according to claim 1, further comprising:
   a display unit configured to display a list of history information of the executed job; and an instruction unit configured to issue an instruction in which a print condition is set based on the displayed list to perform print;

wherein the output unit outputs the image data (image data from the storage unit or the external storage media??) identified according to the history information of the job selected from the displayed list.

12. The apparatus according to claim 11, wherein the output unit outputs image data based on data identified based on reference information being the history information if the print condition is changed from the print condition of the executed job.

13. The apparatus according to claim 11, wherein the output unit outputs image data being the history information if the print condition is equal to the print condition of the executed job.

14. A method comprising:

executing a job for inputting or outputting first image data;

storing the first image data or reference information referring to the first image data as history information by a storage unit;

outputting first image data identified based on the stored history information; and performing control not to store the history information in the storage unit if an attribute of the executed job indicates that the job is a media print job for printing second image data stored in an external storage media and performing control to store the history information in the storage unit if the attribute does not indicate that the job is the media print job.

15. The method according to claim 14, further comprising:

displaying a list of history information of the executed job;

issuing an instruction in which a print condition is set based on the displayed list to perform print; and outputting the image data identified according to the history information of the job selected from the displayed list.

16. The method according to claim 15, wherein the outputting image data is based on data identified based on reference information being the history information if the print condition is changed from the print condition of the executed job.

17. A non-transitory computer readable medium storing a control program for causing a computer to execute a method, the method comprising:

executing a job for inputting or outputting image data;

storing the image data of the executed job or reference information referring to the image data as history information in a storage unit;

outputting image data identified based on the stored history information; and performing control not to store the history information in the storage unit if the attribute of the executed job indicates that the job is a media print job for printing second image data stored in an external storage media and performing control to store the history information in the storage unit if the attribute of the job does not indicate that the job is the media print job.

18. The non-transitory computer readable medium according to claim 17, further comprising:

displaying a list of history information of the executed job;

issuing an instruction in which a print condition is set based on the displayed list to perform print; and outputting the image data identified according to the history information of the job selected from the displayed list.

19. The non-transitory computer readable medium according to claim 18, wherein the outputting image data is based on data identified based on reference information being the history information if the print condition is changed from the print condition of the executed job.

* * * * *